United States Patent [19]
Fidler et al.

[11] 3,773,338
[45] Nov. 20, 1973

[54] FLEXIBLE SEAL

[75] Inventors: Carl E. Fidler, Chillicothe; John W. Yancey, Aurora, both of Ill.

[73] Assignee: Caterpillar Tractor Co., Peoria, Ill.

[22] Filed: Mar. 23, 1972

[21] Appl. No.: 237,352

[52] U.S. Cl.................... 277/95, 277/34.3, 49/490
[51] Int. Cl............................................. F16j 15/34
[58] Field of Search.................... 49/490, 491, 498; 277/95, 85, 88, 226, 34, 34.3

[56] References Cited
UNITED STATES PATENTS
2,590,288  3/1952  Breyfogle et al...................... 277/95
2,700,196  1/1955  Panhard......................... 277/226 X Primary Examiner—Herbert F. Ross
Assistant Examiner—Robert I. Smith
Attorney—Warren J. Krauss et al.

[57] ABSTRACT

A flexible seal for sealing between two members including a hollow body of resilient material which has a mounting wall portion formed therein which portion is securable to one of the members. A sealing wall portion is formed in the body which is disposed oppositely to the mounting wall portion and sealably engageable with the other member. A pair of spaced sidewalls are formed in the body which are readily deformable to permit installation of the seal with the sidewalls in a predetermined, deformed position so as to maintain biased sealing engagement during relative movement between the members.

10 Claims, 2 Drawing Figures

FLEXIBLE SEAL

BACKGROUND OF THE INVENTION

Many large mechanisms, such as hydraulic excavators and cranes, employ a large bearing system to permit relative rotation between upper and lower frame members. Such mechanisms generally have a formed sheet metal enclosure means which houses a rotating drive mechanism wherein one element of the enclosure means is attached to the upper frame member while another element is attached to the lower frame member. Seals are disposed between the rotatable elements to preclude ingress of grit or other foreign particles to the enclosure means and to retain lubricating fluid therein.

A major problem encountered with such systems is that of leakage due to a tendency for such sheet metal components to have warped or wavy surfaces introduced during manufacturing thereof which surfaces result in variations in spacing between the assembled components. These warped or wavy surfaces and the required manufacturing tolerances for such rotating mechanisms permit the spacing between the elements to fluctuate considerably during rotation. In some cases, such fluctuations between the elements are of such magnitude that sealing contact is broken or the sealing member is compressed sufficiently to produce overstress with consequent permanent deformation or premature failure.

OBJECTS OF THE INVENTION

One of the objects of this invention is to provide an improved flexible seal for sealing between a pair of relatively movable members.

Another object of this invention is to provide an improved flexible seal which can be installed in a partially-deformed condition between the members to maintain a biased sealing contact with the members during variations in the spacing therebetween.

Yet another object of this invention is to provide an improved flexible seal having a hollow, substantially rectangularly-shaped body of resilient material which permits the seal to be deformed over a greater range than conventional seals while maintaining its sealing effectiveness.

Other objects and advantages of the present invention will become readily apparent upon reference to the accompanying drawings and following description.

DETAILED DESCRIPTION

Figure 1:
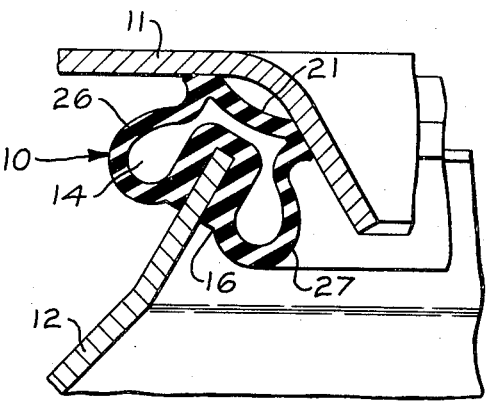
FIG. 1 is a cross-sectional view of a flexible seal embodying the principles of the present invention shown disposed sealingly between two relatively rotatable members.

Referring more particularly to the drawings, a flexible seal embodying the principles of the present invention is indicated generally by the reference numeral 10. The seal is disposed sealingly between a pair of members 11 and 12 which are only partially shown. The members are elements of a circular sheet metal enclosure; member 11 being rotatable relative to member 12. Due to inherent manufacturing tolerances and wavy surfaces introduced during manufacturing of such sheet metal elements, the members exhibit a predetermined range of fluctuation in radial and axial spacing therebetween during relative rotation.

Figure 2:
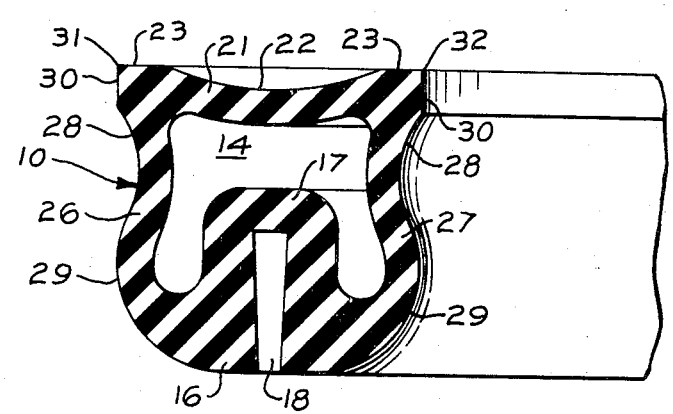
FIG. 2 is a cross-sectional view of the flexible seal in its free, undeformed state.

The flexible seal comprises a hollow annular body having an annular passage 14 formed therein. The annular body is made from a resilient material such as rubber or other suitable flexible plastic material. In its free form, as shown in FIG. 2, it has a substantially rectangular cross-sectional configuration. Part of the body forms a mounting wall portion 16 which includes a projection 17 centrally formed thereon which protrudes inwardly. An annular groove or recess 18 is formed within the mounting wall portion and projection 17. This groove is formed wider across at its inwardly-projecting end than at its external end when the seal is in its free state, as shown in FIG. 2. This provides a bias for firm retention of the seal when installed.

A sealing wall portion 21 is formed on the body opposite to the mounting wall portion 16. As clearly shown in FIG. 2, the sealing wall portion has an external concave surface 22 formed between a pair of symmetrically-disposed, generally-flat sealing surfaces 23.

The body further includes a pair of oppositely-disposed, spaced-apart sidewalls 26 and 27 which individually extend between and interconnect the mounting wall portion 16 and sealing wall portion 21. The sidewalls are symmetrical and each has an undulatory shape defined by a concave portion 28 proximal to the sealing wall portion and a convex portion 29 proximal to the mounting wall portion.

It will be noted that the sidewalls 26 and 27 have a substantially thinner cross-sectional configuration and consequently less flexure strength than the closely-adjacent areas between the sidewalls at the upper and lower parts of the body. As further explained, hereinafter, this configuration provides for a high resistance to deformation and for shape retention in the strenghtened areas and for resilient biasing deformation in the sidewalls.

Sealing surfaces 30 are formed on the upper extremity of each of the sidewalls. These surfaces together with respective sealing surfaces 23 cooperate normally to form a pair of substantially rectangular edges 31 and 32. The convex portions 29 form substantially curved corners between the mounting wall portion and the sidewalls.

As best shown in FIG. 1, with the flexible seal 10 installed in a sealing position between the members 11 and 12, the annular groove 18 of the mounting wall portion 16 registers with member 12 in secure sealing relation thereto. The aforementioned width differential between the inner and outer ends of the groove 18 assures a tight biased fit. As shown, the edges 31 and 32 are in contact with member 11 and are compressed so that both pairs of sealing surfaces 23 and 30 are in intimate sealing contact with the member. Such edge compression would occur subsequent to deformation of the sidewalls 26 and 27 due to the aforementioned flexure strength and thickness configurations of the various parts of the body.

In an alternate installation, sealing contact could be made to occur only between the sealing surfaces 23 and a member 11 arranged substantially parallel to the sealing wall portion 21. Another installation arrangement for the seal could have the sealing wall portion arranged in a grooved member wherein sealing contact would occur between both pairs of sealing surfaces and the member without deformation of the edges 31 and 32.

The seal is installed preferably in a predetermined deformed condition wherein the sealing wall portion is forced toward the mounting wall portion by the member 11. In this condition, the seal accommodates a predetermined range of multi-directional fluctuations in spacing between the members while maintaining sealing contact with the member 11. For example, if one of the members moves away from the other member, the biased resiliency of the seal sidewalls causes the sealing wall portion to move in a direction away from the mounting wall portion so that the sealing wall portion remains in contact with the member 11. The instant flexible seal is deformable beyond the predetermined deformed installation condition so as to accommodate movement of the members in a direction toward each other without overstressing the seal.

As noted previously, the major portion of the deformation in the flexible seal 10 occurs in the sidewalls 26 and 27, and the undulatory shape of the sidewalls provides a preshape to provide a predetermined direction of the deformation. The symmetrical shape of the sidewalls insures substantially equal resistance to such deformation and constant sealing pressure between the sealing surfaces and the member 11 over a predetermined range of seal deformations.

In view of the foregoing, it is readily apparent that the structure of the present invention provides an improved flexible seal for sealing between a pair of relatively movable members which are subjected to variations in the spacing therebetween. The flexible seal utilizes a resilient hollow body which has readily deformable sidewalls to permit installation thereof in a predetermined deformed condition such that biased sealing contact with the members is maintained during such variations in spacing between the members.

While the invention has been described and shown with particular reference to the preferred embodiment, it will be apparent that variations are possible within the spirit of the inventive concepts and that no limitation is intended, except by the scope of the appended claims.

What is claimed is:

1. A flexible seal, for sealing between relatively disposed movable members, comprising; a hollow body means of resilient material, said body means having a mounting wall portion formed thereon for secure engagement with one of said members, said mounting wall portion including groove means formed therein for registry with one of said members, a sealing wall portion formed on said body means substantially oppositely disposed with respect to said mounting wall portion and sealably engageable with another of said members, and said body means including a pair of spaced sidewall means formed between said mounting wall portion and said sealing wall portion, said sidewall means being readily deformable for permitting the installation of said flexible seal between said members with said sidewall means in a predetermined deformed condition to maintain biased sealing contact during predetermined relative movement between said members in multiple directions, each of said sidewall means having a concave portion adjacent to said sealing wall portion and a convex portion adjacent to said mounting wall portion forming an undulatory shape for preshaping the sidewall means to control the direction of deformation thereof.

2. The flexible seal of claim 1 wherein said sealing wall portion includes a first pair of spaced flat sealing contact surfaces individually operatively associated with said sidewall means.

3. The flexible seal of claim 2 wherein said body means has a thicker cross-sectional configuration at said areas adjacent to said sealing contact surfaces than in said sidewall means.

4. The flexible seal of claim 2 wherein said sidewall means include a second pair of spaced sealing contact surfaces juxtaposed to said first pair of flat sealing contact surfaces.

5. The flexible seal of claim 1 wherein said mounting wall portion includes an annular projection which protrudes inwardly within said hollow body means.

6. The flexible seal of claim 1 wherein said groove means are wider at one end thereof than at the other.

7. A flexible seal, for sealing between relatively disposed movable members, comprising; a hollow body means of resilient meaterial having a substantially rectangular cross section, mounting wall means formed on said body means and having mounting means therein for engagement with one of said members, said mounting means including groove means, sealing wall means formed on said body means substantially oppositely disposed to said mounting wall means and sealably engageable with another of said members, and a pair of sidewall means formed on said body means, said sidewall means being disposed between and interconnecting said mounting wall means and said sealing wall means, said sidewall means being readily deformable and having an undulatory shape which causes inward deformation adjacent to said sealing wall means and outward deformation of said sidewall means adjacent said mounting wall means for readily deforming to permit installation of said seal between said members with said sidewall means in a predetermined deformed condition to maintain biased sealing contact with said members during multi-directional relative movement therebetween.

8. The flexible seal of claim 7 wherein said sealing wall means include in undeformed condition a centrally-disposed concave portion and a pair of flat sealing contact surfaces individually disposed on opposite sides of said concave portion.

9. The flexible seal of claim 8 wherein said mounting means include an annular groove formed in said mounting wall means for registry with one of said members.

10. The flexible seal of claim 9 wherein said undulatory shape of each of said sidewall means is formed by a concave portion adjacent to said sealing wall means and a convex portion adjacent to the mounting wall means to provide a predetermined direction of deformation of said sidewall means, and wherein said sidewall means are symmetrical to provide substantially equal resistance to deformation.

* * * * *